United States Patent [19]
Thümmler et al.

[11] 3,833,354
[45] Sept. 3, 1974

[54] PROCESS FOR TRANSFORMING LIQUID FURNACE SLAG INTO GRANULES

[75] Inventors: Ursus Thümmler, Erftstadt Liblar; Hugo Werner, Hurth-Hermulheim; Hans Kerber, Hurth-Knapsack, all of Germany

[73] Assignee: Knapsack Aktiengesellschaft, Knapsack near Cologne, Germany

[22] Filed: Nov. 16, 1972

[21] Appl. No.: 307,166

[30] Foreign Application Priority Data
Nov. 20, 1971 Germany............................ 2157653

[52] U.S. Cl..................... 75/24, 75/0.5 C, 75/132, 65/19, 264/11
[51] Int. Cl.............................................. C21b 3/08
[58] Field of Search ......... 75/.5 C, 24, 132; 264/11, 264/14; 65/19, 20

[56] References Cited
UNITED STATES PATENTS

| | | | |
|---|---|---|---|
| 443,898 | 12/1890 | Colquhoun | 75/24 |
| 1,699,575 | 1/1929 | Spies | 65/20 |
| 2,533,633 | 12/1950 | Schott | 75/.5 C |
| 2,569,779 | 10/1951 | Porter | 264/14 |
| 3,523,015 | 8/1970 | Grady | 65/20 X |
| 3,615,329 | 10/1971 | Jones, Jr. | 65/19 |
| 3,720,506 | 3/1973 | Muller et al. | 75/24 |

Primary Examiner—L. Dewayne Rutledge
Assistant Examiner—M. J. Andrews
Attorney, Agent, or Firm—Connolly and Hutz

[57] ABSTRACT

Liquid furnace slag, more particularly liquid phosphorus furnace slag, is transformed into granules. To this end, impinging contact between a free falling stream of liquid slag and a focused stream of water maintained under a pressure between 0.5 and 1.5 atmospheres gauge is produced so as to effect break-up of the slag into particles. The resulting particles are delivered to, and complete solidification thereof is effected in, a cooling zone having water therein.

1 Claim, 1 Drawing Figure

PATENTED SEP 3 1974          3,833,354
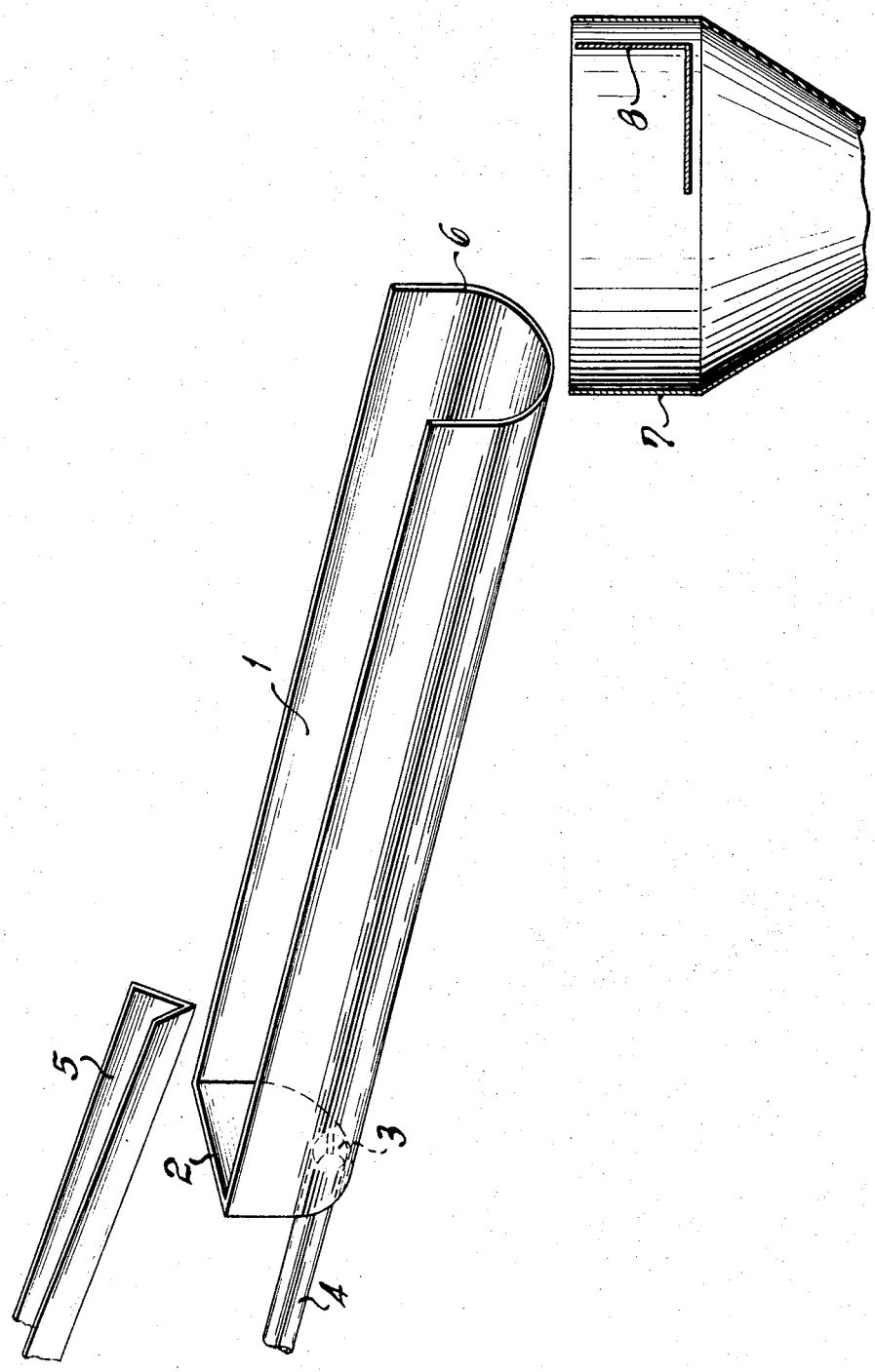

PROCESS FOR TRANSFORMING LIQUID FURNACE SLAG INTO GRANULES

The present invention relates to a process for transforming liquid furnace slag, more especially liquid phosphorus furnace slag, into granules, and to a device for carrying out this process.

It is known that liquid furnace slag can be granulated by conveying it together with water through a cooling zone. As the exchange of heat between the liquid slag and water has been found to be handicapped by the formation of a steam film between the surfaces of contact of the two phases (Leidenfrost's phenomenon), it is necessary to use a rather long cooling zone so as to effect the abstraction of heat contained in liquid slag, which normally issues from the furnace at temperatures higher than 1,350° C. In addition to this, the granulation of liquid phosphorus furnace slag in the manner just described above may take place explosively upon the contact of ferrophosphorus proportions in the slag with water, which gives rise to the formation of oxyhydrogen gas.

Liquid furnace slag can also be granulated by producing impinging contact between the molten slag and individual streams of water. The individual streams of water, which form a water jacket are forced to flow under a pressure between 3 and 6 atmospheres gauge through a set of nozzles arranged in annular fashion, so as to effect break-up of the slag into particles and quench the slag particles. This, however, results in the formation of granules having a considerable proportion of felted fine particles therein, which are difficult to dehydrate.

In addition to this, the presence of fine granular particles in the granulating water, which is commonly circulated, has been found to subject nozzles and pumps to considerable wear. Still further, it is an energetically costly and non-beneficial procedure to supply water under a pressure between 3 and 6 atmospheres gauge.

It is accordingly an object of the present invention to provide a fully satisfactory process for transforming liquid furnace slag, more particularly liquid phosphorus furnace slag, into granules, and a device for carrying out the process, which enables use to be made of a short cooling zone and enables oxyhydrogen gas explosions to be effectively prevented during the granulation of phosphorus furnace slag having ferrophosphorus therein.

The invention will now be described with reference to the accompanying diagrammatic representation of an exemplary embodiment.

As can be seen, a cooling channel or groove 1 in inclined position, has a closed upper end 2, which is placed at a level higher than lower end 6. A water supply pipe 4 fitted with a flat-mouthed nozzle 3 having a rectangular cross sectional area is arranged to open into the lower portion of upper end 2. Placed above cooling groove 1 is a slag supply means 5 and placed downstream of the lower deep end 6 of cooling groove 1 is a funnel 7 together with an angled baffle plate 8.

The process of the present invention comprises more particularly producing impinging contact between a free falling stream of liquid slag and a focused stream of water maintained under a pressure between 0.5 and 1.5 atmospheres gauge, so as to effect break-up of the liquid slag into particles, delivering the slag particles to, and effecting complete solidification thereof in, a cooling zone having water therein.

Further embodiments of the process of the present invention, which can be used singly or in combination, provide:

a. for the stream of liquid slag to be conveyed in free fall across a height at which the kinetic energy inherent to the said stream of liquid slag is smaller than that of the focused stream of water;

b. for the water to be used at temperatures between 10° and 80° C, preferably between 45° and 70° C;

c. for a ratio by weight between 1:15 and 1:20 to be established for the mixture of slag and water issuing from the cooling zone.

The device for carrying out the process of the present invention substantially comprises a cooling groove 1 in inclined position having a closed upper end 2, which is placed at a level higher than lower end 6; a water supply means 4 fitted with a flat-mouthed nozzle 3 having a rectangular cross-sectional area and opening into the lower portion of said upper end 2; a slag supply means 5 placed above the said cooling groove 1; and a funnel 7 placed downstream of the lower deep end 5 of said cooling groove 1.

Further embodiments of the device of the present invention, which can be used singly or in combination, provide:

d. for funnel 7 to be connected to the suction-side of a pump and e. for an angled baffle plate 8 to be arranged near the upper portion of funnel 7 so as to be spaced from the lower deep end 6 of said cooling groove 1 and so as to be paralell with the wall of said funnel 7.

By producing impinging contact between the compact stream of slag and a focused stream of water and effecting break-up of the slag into particles, solidification thereof is considerably facilitated as liquid slag practically ceases to be enveloped by steam inhibiting the abstraction of heat. It is accordingly possible to reduce the length of the cooling zone substantially to one third of the length normally required.

The kinetic energy inherent to the stream of water, which is maintained under a pressure between 0.5 and 1.5 atmospheres gauge, effects break-up of the stream of slag into relatively coarse particles and avoids the formation of very fine granular particles, which tend to felt together and are difficult to dehydrate.

Use can be made of the process of the present invention for cooling liquid phosphorus furnace slag having ferrophosphorus therein. Upon impinging contact with the focused stream of water, the ferrophosphorus is crushed and cooled to such an extent that violent oxyhydrogen gas reactions are no longer likely to occur.

We claim:

1. A process for granulating a melt comprised of phosphorus furnace slag and ferrophosphorus, which comprises splintering a stream of the melt by dropping it freely on and into a single smooth-surfaced jet of water, the melt stream being dropped on and into the jet of water from a height above the jet which imparts a kinetic energy to the melt stream as it drops into the jet of water which is less than the kinetic energy of the jet of water whereby the melt is transformed into splintered particles which are entrained in the jet of water, the jet of water having a temperature between 45° and 70° and being maintained under a pressure between 0.5 and 1.5 atmospheres gauge; delivering the jet of water and entrained splintered particles of the melt to a cooling zone having water therein and allowing the splintered particles to completely solidify therein into a blend comprised of granulated phosphorus furnace slag, ferrophosphorus and water in a ratio by weight of solid material to water between 1 : 15 and 1: 20; and removing the blend from the cooling zone.

* * * * *